Sept. 16, 1924.  F. D. ARNOLD  1,508,913
GRAZING MUZZLE
Filed May 14, 1923
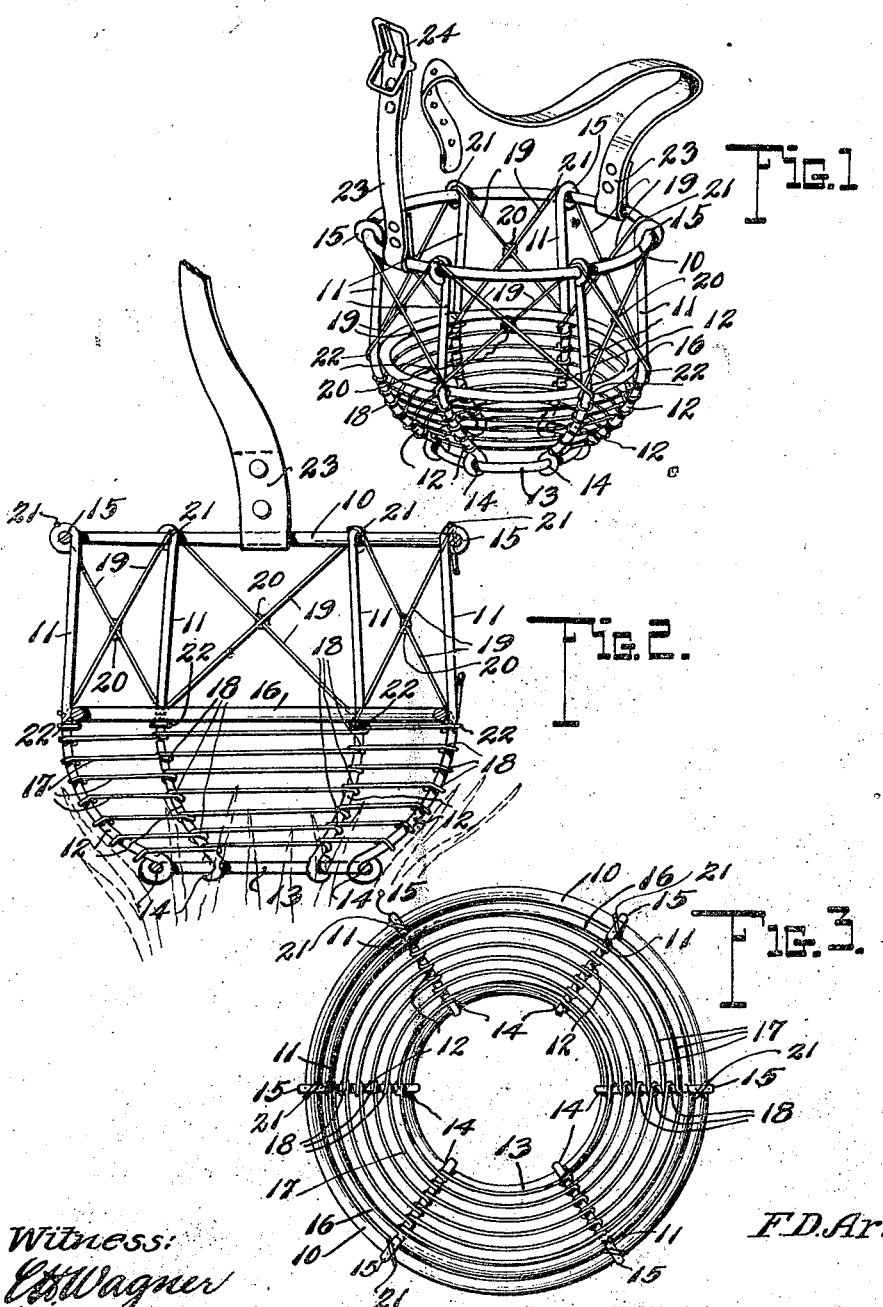

Patented Sept. 16, 1924.

1,508,913

UNITED STATES PATENT OFFICE.

FREDERICK D. ARNOLD, OF MANTECA, CALIFORNIA.

GRAZING MUZZLE.

Application filed May 14, 1923. Serial No. 638,872.

*To all whom it may concern:*

Be it known that I, FREDERICK D. ARNOLD, a citizen of the United States, residing at Manteca, in the county of San Joaquin and State of California, have invented certain new and useful Improvements in Grazing Muzzles, of which the following is a specification.

This invention relates to a grazing muzzle, and particularly to a construction adapted to limit the amount of pasturage which the animal can secure during a given time.

In practical experience it has been found that in pasturage, particularly fields of alfalfa, the animal is inclined to eat too rapidly and excessively, which in many instances produces "bloat" and other disorders due to overfeeding. In prior constructions of muzzles this regulation of the feeding has not been effectually secured and the muzzles themselves have formed more or less of a hindrance to the animal in feeding and a source of irritation.

The present construction, therefore, presents a structure of muzzle of an original character having a feed opening which is proportioned in area to the animal or cattle using the same, and the walls of the muzzle are so constructed as to deflect or press away adjacent growth, permitting a limited amount of alfalfa or grass to pass upward through the feed opening and accessible to the mouth of the animal upon which the muzzle is used. During feeding, the mouth of the animal closely approaches the ground and field growth so that if of a flexible character it is pressed against the mouth of the animal and defeats his free feeding, which is avoided by the present construction where the muzzle is always spaced at a proper distance from the head of the animal and the lower portion thereof screened or partly closed so as to prevent the ordinary entrance of alfalfa excepting at the feed opening, and such screening is of an open character to permit the free access of air which would be prevented by a muzzle of a solid character.

With the present construction the animal can be left in a field of alfalfa as the amount thereof secured at each mouthful is limited and thus too rapid eating is prevented and also the injurious results thereof. The invention is also particularly adapted for use in early spring crops of alfalfa which contain a large amount of weed growth and if cattle are allowed to pasture thereon there is danger of "bloating" or overfeeding. This first crop is often mowed and burned, as after it goes to seed the weed pods have sharp points which lodge in the animals' jaws and produce dangerous running sores, but with a muzzle of this type the cattle can be turned in to feed in such a field, as only the proper amount of alfalfa for feeding purposes passes through the feed opening accessible to the mouth of the animal.

The invention has for an object to provide a muzzle of rigid character comprising a supporting ring having a series of bars extending therefrom to a feeding ring of predetermined size, the said bars being provided at their lower portions with a mesh structure to prevent the entrance of feed excepting through the opening provided for that purpose.

Other and further objects and advantages of the invention will be hereinafter set forth and the novel features thereof defined by the appended claims.

In the drawing:—

Figure 1 is a perspective of the invention;

Figure 2 is a vertical cross section thereof; and

Figure 3 is a top plan.

Like numerals refer to like parts in the several figures of the drawing.

The numeral 10 designates a supporting ring which may be of any desired character and size, preferably formed of wire, and depending therefrom are a series of bars 11 which at their lower ends are curved inwardly at 12 and connected to a feeding ring 13. This connection may be effected in any preferred manner, for instance by looping the lower ends of the bars over the ring as at 14, and applying solder to prevent lateral displacement. The upper end of the bar is similarly connected at 15 to the supporting ring 10. It will be noted that the feed ring is of less diameter than the supporting ring and this feed ring is formed in different sizes relative to the animal with which it is to be used and the size thereof controls the amount of pasturage fed during a predetermined time.

Intermediate of the supporting and feed rings a bracing ring 16 is provided which is secured to the bars 12, and between this bracing ring and the feed ring a series of parallel mesh wires 17 are mounted upon the bars in such relation as to press away from the feed opening any pasturage which does not pass directly upward therethrough and accessible to the mouth of the animal. These wires 17 may be secured to the bars in any preferred manner but a desirable arrangement thereof is shown wherein the wires are looped about each of the bars as at 18 and secured against lateral displacement by soldering or otherwise connecting the same to the bars. This provides a series of parallel wires extending circumferentially of the lower portion of the muzzle.

The upper portion of the muzzle is braced against displacement and strain by the truss wires 19 which cross each other and are secured together as at 20. These truss wires pass over the supporting ring 10 as shown at 21, and are bent around the bars 12 beneath the bracing ring 16, as shown at 22, thus forming a rigid structure which may be held in firm position upon the head of the animal by any desired means, for instance the straps 23 extending from the supporting ring and provided with the buckle or other attachment 24 as shown in Figure 1.

In operation the muzzle prevents the free grazing in fields having weeds or injurious plant growth as the cattle can only reach the grass or alfalfa which extends up into the feed ring, while the growth at each side is turned away therefrom by the curved walls of the muzzle. This requires a structure of such rigid character that the contact thereof with the weed growth or with the ground will not change its relative position to the mouth of the animal disposed directly opposite the feed opening. While the invention is primarily intended to prevent "bloat" or other diseases incident to too rapid or overfeeding, the area of the feed opening may be determined so as to regulate the amount of feed the animal shall obtain in its mouth at one time and thus comprises a feed regulator which is important when animals are permitted to pasture in fields having very rich or high growth of pasturage.

The term "ring" has been used herein as designating the several supporting members but is not intended to necessarily define a circular member, as the configuration of the muzzle and the details of its construction may be altered without departing from the spirit of the invention as defined in the appended claims.

Having thus described my invention, what I claim as new and desire to secure by Letters Patent is:—

1. A grazing muzzle comprising a supporting means, rigid bars depending therefrom, a feed ring secured to said bars and having an unobstructed opening of substantially one half the diameter of the supporting ring to determine the area of pasturage, a bracing ring intermediate the supporting and feed rings, and a meshing portion comprising wires encircling the rigid bars and extending parallel to the feed ring to form a relatively close mesh.

2. A grazing muzzle comprising a supporting ring, rigid bars depending therefrom, a feed ring secured to said bars and having an unobstructed opening of substantially one half the diameter of the supporting ring to determine the area of pasturage, a bracing ring intermediate the supporting and feed rings, a meshing portion to deflect pasturage between the bracing and feed rings, and diagonally disposed cross wires extending between the supporting and bracing rings and intermediate the rigid bars.

3. A grazing muzzle comprising a supporting ring, rigid bars depending therefrom and curved inwardly at their lower portion, a feed ring secured to said bars at said portion and having an unobstructed opening to determine the area of pasturage, wires encircling each rigid bar and extending parallel to the feed ring to form a relatively close mesh, a bracing ring at the upper portion of said parallel wires, and truss wires over said supporting ring and intermediate the rigid bars to stiffen the upper open portion of the muzzle.

In testimony whereof I affix my signature.

FREDERICK D. ARNOLD.